UNITED STATES PATENT OFFICE.

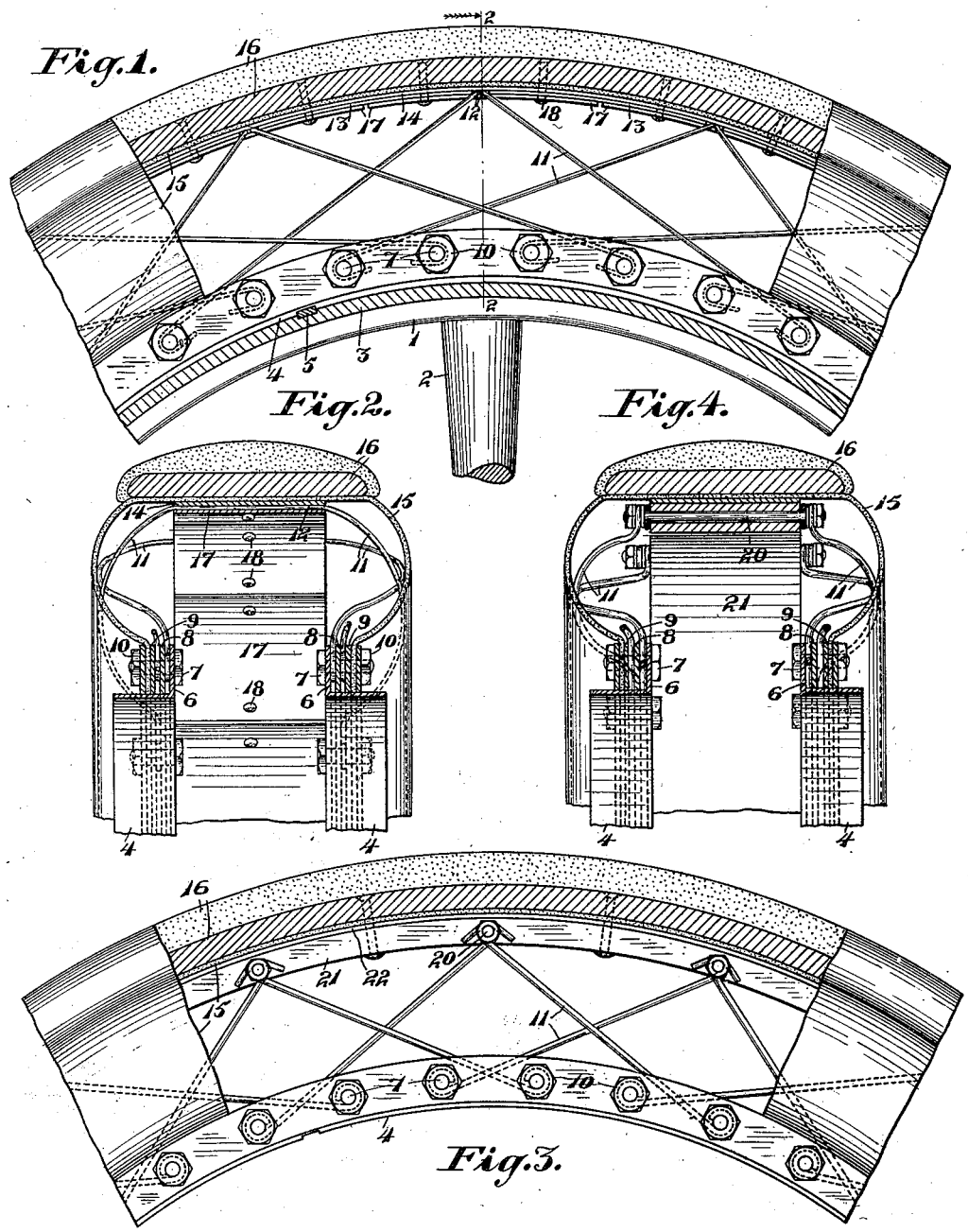

EMIL E. HOFF, OF SAN RAFAEL, CALIFORNIA.

RESILIENT TIRE.

1,022,735.  Specification of Letters Patent.  Patented Apr. 9, 1912.

Application filed March 14, 1911. Serial No. 614,294.

*To all whom it may concern:*

Be it known that I, EMIL E. HOFF, a citizen of the United States, residing at San Rafael, in the county of Marin and State of California, have invented new and useful Improvements in Resilient Tires, of which the following is a specification.

The object of the present invention is to provide a resilient tire for vehicles, which, while possessing in a very great measure the resiliency of pneumatic tires at present commonly used, will avoid the objections to said tires, such as the great expense thereof and the danger and trouble caused by punctures and blow-outs.

In the accompanying drawing, Figure 1 is a side view of a portion of a tire constructed in accordance with my invention; Fig. 2 is a transverse section thereof on the line 2—2 of Fig. 1; Fig. 3 is a similar side view of a modified form of the invention; Fig. 4 is a sectional view of said latter form.

Referring to the drawing, 1 indicates the felly of the wheel secured to spokes 2 and having a rim 3. Fitting tightly around said rim are two rings 4, spaced from one another a suitable distance, keys 5 at suitable angular intervals around the wheel being driven in between said rings and the rim to prevent them turning on it. Each ring is angular in cross-section, having a flange 6 extending outwardly, or in a plane parallel with the wheel, said flanges extending from the inner or opposing edges of the rings. Through holes formed in said flanges at uniform distances around the rings are passed bolts 7, the bolts of each flange also passing each through holes formed in two supplementary rings 8, 9, nuts 10 being secured on the outer ends of said bolts. Around said bolts, both between the flange 6 and the inner ring 8, and also between the inner ring 8 and the outer ring 9, are hooked the inner ends of two series of stay wires 11. The outer ends of said stay wires are secured to an outer ring, either resilient or solid, both of which forms are here shown. In either case, the stay wires of both series extend each outward in a plane oblique to the radial direction of the wheel, and making a very acute angle with a tangent to the ring from which they extend, but the stay wires of the two series extend in opposite directions, so that each stay wire passes closely adjacent to three of the stay wires of the other series. This number, however, may be varied according to the size of the wheel. Each stay wire is in its own plane curved convexly outward and then inward again at its outer end.

I may observe that it is not of the essence of my invention that there should be two series of stay wires, since the stay wires of one series might be omitted, especially for a small wheel, and almost equally good results obtained. It is in regard to the outer rim of the wheel and the mode of attaching said stay wires to said outer rim that the two forms of my invention differ. In the form of the invention shown in Figs. 1 and 2, stay wires on opposite sides of the wheel are united by an intermediate wire 12 formed integral with the wires 11, all of said intermediate portions 12 being passed between plates 13 of said fiber or other suitable material, which rest against the inner surface of a band 14 of spring steel, which in turn rests against the inner surface of a cover 15 of leather or canvas. Said cover surrounds said stay wires and its edges are secured by means of the nuts 10 to the bolts 7. On said cover is a tread 16 of leather, fiber, or any suitable material, and on the inner surfaces of said plates 13, metal plates 17 are secured by rivets 18, passed through said plates 13, band 14, and cover 15. Said plates are spaced slightly from each other to allow of a resilient movement of the spring band 14.

In the modification shown in Figs. 3 and 4 the outer ends of the stay wires are hooked around bolts 20 passed transversely through a felly 21 of wood or other suitable material, said felly being surrounded by a ring 22 of sheet metal, a cover 15 and a tread 16 being employed as before. This construction is adapted especially for heavy vehicles.

The great resiliency and also durability of my improved tire arises from the fact that the stay wires not only extend in planes making a very considerable angle with the radial direction of the wheel, but in said planes said stay wires are of an outwardly bowed form. When wheels fitted with my improved rims encounter an obstacle, which by the momentum of the vehicle would cause a sudden shock to be transmitted to said vehicle, said shock is not taken up by compression of the stay wires. This is sufficiently shown by the fact that both ends of said stay wires are only hooked around the bolts, so that any compression thereof, instead of tending to further bend said stay wires, would have the effect of simply moving their looped ends on said bolts. The shock or jar upon the wheels is taken up by the resilient elongation of the spring stay wires at the upper portion of the wheels, and I provide for this elongation being possible by forming the stay wires in an outwardly convex or bowed form. In this respect I believe my invention to be novel, as in no prior tire, so far as I am aware, have stay wires been used which extended obliquely in planes almost tangential to the radial direction of the wheel and which in said planes are convexly curved outward. I find that this is the only construction which will give the necessary resiliency and at the same time provide a durable rim. Said stay wires if extending in directions oblique to the radius of the wheel but in curved surfaces therefrom, by long usage tend to bend more and more, until they abut against the outer rim and eventually break. Since the construction of the parts to which the inner and outer ends of said stay wires respectively are secured may vary greatly without affecting the character of my invention, I have referred to these parts respectively as the inner rim portion, and the outer rim portion.

I claim:—

1. In a vehicle tire, the combination of an inner rim portion and an outer rim portion, and spring stay wires connected at their respective ends to and between said portions and extending each in a plane making a considerable angle with the radial direction of the wheel, the middle portion of each stay wire being curved convexly outward, substantially as described.

2. In a vehicle tire, the combination of an inner rim portion and an outer rim portion, and two series of spring stay wires connected at their respective ends to and between said portions, and extending each in a plane making a considerable angle with the radial direction of the wheel, adjacent wires of the two series crossing each other, and the middle portions of said stay wires being curved convexly outward, substantially as described.

In testimony whereof I have hereunto set my hand in the presence of two subscribing witnesses.

EMIL E. HOFF.

Witnesses:
FRANCIS M. WRIGHT,
D. B. RICHARDS.

Copies of this patent may be obtained for five cents each, by addressing the "Commissioner of Patents, Washington, D. C."